United States Patent
Nishimura et al.

(10) Patent No.: US 6,191,811 B1
(45) Date of Patent: *Feb. 20, 2001

(54) FILM IMAGE REGENERATING METHOD AND DEVICE

(75) Inventors: Toru Nishimura; Naoshi Sugiyama, both of Asaka (JP)

(73) Assignee: Fuji Photo Film Co., Ltd., Kanagawa (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/791,139

(22) Filed: Jan. 30, 1997

(30) Foreign Application Priority Data

Jan. 31, 1996 (JP) .................................................. 8-016191
Apr. 18, 1996 (JP) .................................................. 8-096998
Nov. 15, 1996 (JP) .................................................. 8-304491

(51) Int. Cl.[7] .................................................. H04N 5/253
(52) U.S. Cl. .................................................. 348/96; 348/110
(58) Field of Search .................................. 348/96, 97, 98, 348/99, 100, 110, 111, 112; 358/527, 351, 506, 451; 382/298; 396/319

(56) References Cited

U.S. PATENT DOCUMENTS

| 5,023,651 | * | 6/1991 | Burch et al. | 348/96 |
| 5,541,644 | * | 7/1996 | Nanba | 348/96 |
| 5,633,733 | * | 5/1997 | Miyazawa | 358/527 |
| 5,633,977 | * | 5/1997 | Inoue et al. | 348/99 |
| 5,657,074 | * | 8/1997 | Ishibe et al. | 348/96 |
| 5,659,354 | * | 8/1997 | Oosaka | 348/96 |
| 5,768,642 | * | 6/1998 | Sugiyama et al. | 396/319 |
| 5,808,667 | * | 9/1998 | Sugiyama | 348/96 |

FOREIGN PATENT DOCUMENTS

| 4-223454 | 8/1992 | (JP) . |
| 5-19359 | 1/1993 | (JP) . |
| 7-311457 | 11/1995 | (JP) . |
| 8-32908 | 2/1996 | (JP) . |
| 8-82862 | 3/1996 | (JP) . |
| WO9004301 | 4/1990 | (WO) . |

* cited by examiner

Primary Examiner—Chris S. Kelley
Assistant Examiner—Gims Philippe

(57) ABSTRACT

Frames images in all frames on developed photographic film are read first, and an index image is made of a plurality of frames to be displayed on a TV monitor. Then, one of a plurality of regeneration modes is designated. When regeneration in the designated regeneration mode is commanded, frame images on the photographic film are read on a frame-by-frame basis. The read frame images are regenerated on the TV monitor on a frame-by-frame basis in the designated regeneration mode. Thereby, a regeneration mode suitable for the film can be selected among a plurality of regeneration modes, while the frame images on a roll of film are confirmed by means of an index image displayed during regeneration mode selection.

8 Claims, 16 Drawing Sheets

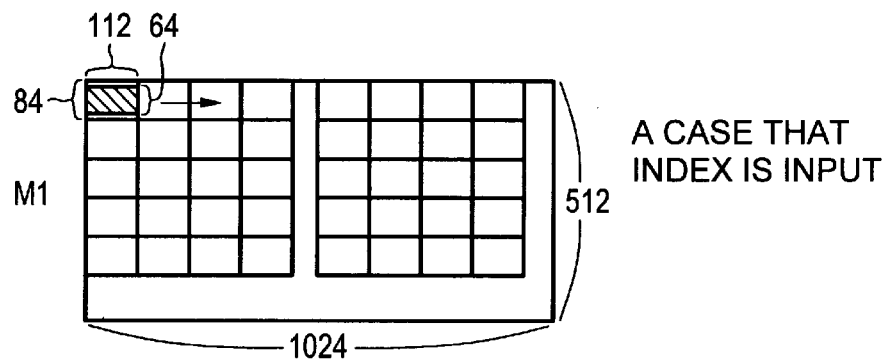
FIG. 8(A)  A CASE THAT INDEX IS INPUT
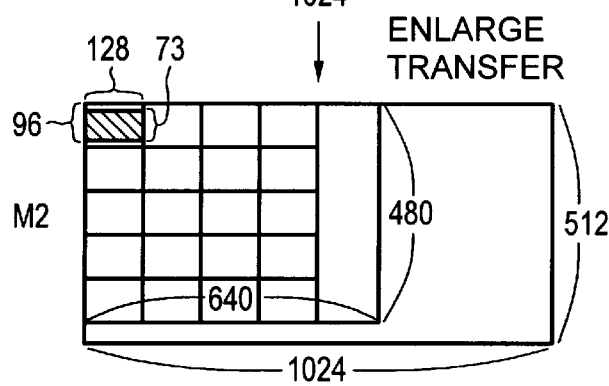
FIG. 8(B)
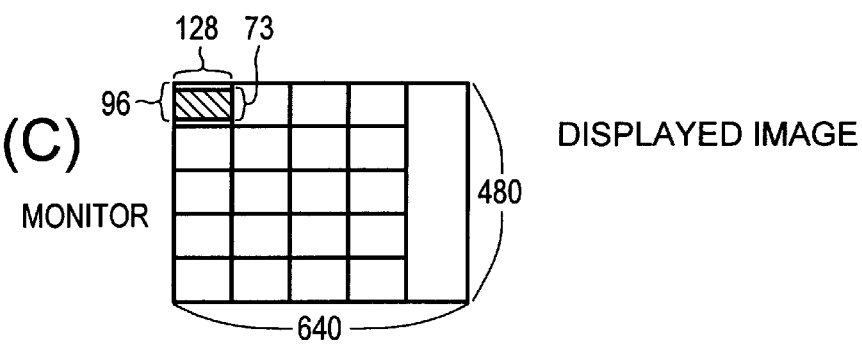
FIG. 8(C)  DISPLAYED IMAGE
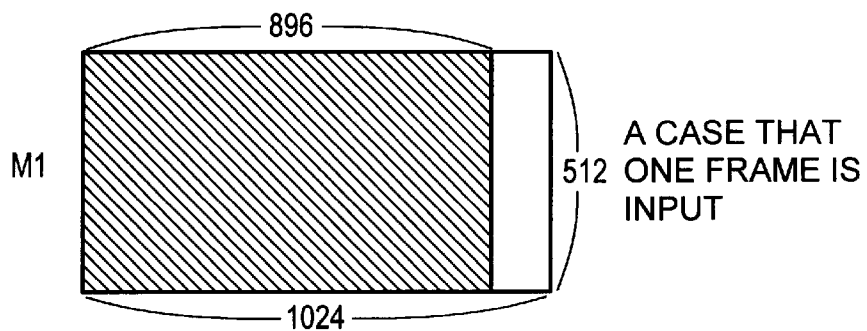
FIG. 8(D)  A CASE THAT ONE FRAME IS INPUT

FIG. 14

|  | P 7 6 5 4 3 2 1 |
|---:|:---|
| I D 1 | 0 0 0 0 0 1 1 1 |
| I D 2 | 0 1 0 0 0 0 1 1 |
| L N G | 0 0 1 0 0 1 1 0 |
| 1st Byte | 0 1 1 1 1 0 0 1 |
| 2nd Byte | 1 0 1 0 0 0 0 1 |
| 3rd Byte | 1 0 1 1 0 1 0 1 |
| 4th Byte | 0 0 1 0 0 0 0 0 |
| 5th Byte | 1 0 1 1 0 1 0 1 |
| 6th Byte | 0 0 1 0 0 0 0 0 |
| L R C | 1 0 1 1 1 0 1 0 |

FILM IMAGE REGENERATING METHOD AND DEVICE

BACKGROUND OF THE INVENTION

1. Field of the Invention

The present invention relates to a film image regenerating method. More particularly, the present invention pertains to a film image input method and device for editing magnetic information recorded on film.

2. Description of the Related Art

There is proposed a method which comprises the steps of recording an aspect ratio of a screen (print type), zooming magnification, trimming information, etc. on a magnetic recording layer on photographic film during photographing or after photographing, and using the magnetic information recorded on the magnetic recording layer for determining conditions required for making a photographic print (Japanese Patent Provisional Application Nos. 4-223454 and 5-19359). There is proposed another method which comprises the steps of recording optical information indicating the print type, etc. in an area other than a frame image region of the film during photographing, and using the optical information for determining conditions for making a photographic print.

WO90/04301, etc. disclose a film player which picks up developed photographic film for a still camera by means of an image sensor such as a charge coupled device (CCD), and converts an image of photo film into an image signal, and outputs the image signal to a TV monitor to display a film image.

Furthermore, there is proposed a film image regenerating device which reads frame images of all frames on a roll of photographic film, and has an index displaying mode for making an index image composed of plural frames to display it on a TV monitor, and a one screen regenerating mode for displaying the read frame image on the TV monitor. There are proposed some methods for editing magnetic information recorded on a magnetic recording layer on photographic film while viewing an index screen and a one frame regenerating screen displayed on the TV monitor.

That is, Japanese Patent Application No. 6-923 discloses a method for editing a print type and the number of prints on the index screen in order to make additional prints. Japanese Patent Application No. 6-162193 discloses a method for editing information indicating title, date, screen switching, color correction, setting of screen movement, and the direction of a frame. Further, Japanese Patent Application No. 6-218873 discloses print order information required for making additional prints and a method for editing a variety of information only on an index screen.

When a plurality of film images on a roll of film are sequentially displayed on a TV monitor by a film player, the film images may be regenerated on an image-by-image basis, or the film images may be sequentially regenerated at predetermined intervals. It is desirable that a user can select an appropriate method of regenerating the film images. In this case, if what is captured onto the film cannot be understood, it is difficult to determine how to regenerate the film images.

Moreover, a title common to all frames on a roll of film (hereinafter referred to as an all-frame title) may be set and designated for printing. In this case, if what is captured onto the film cannot be understood, it is impossible to set a proper all-frame title.

SUMMARY OF THE INVENTION

The present invention has been developed under the above-described circumstances, and has as its object the provision of film image regenerating method and device which regenerate a roll of film on a frame-by-frame basis in a regeneration mode suitable for the film, and can designate a proper all-frame title for the film, and can clearly and easily edit print order information required for making additional prints and magnetically record the information.

In order to achieve the above-mentioned object, the present invention is directed to a film image regenerating method, in which developed photographic film is fed to an image reading section so that frame images can be read, and a plurality of frame images on the photographic film are displayed on a display, and provided with an index display mode for reading frame images in a plurality of frames on the photographic film and making an index image composed of a plurality of frames to display it on the display; a plurality of regeneration modes for reading the frame images on a frame-by-frame basis and displaying the readout frame images on a frame-by-frame basis on the display; an index image is displayed first on the display in the index display mode while a film image is regenerated; one of a plurality of the regeneration modes is allowed to be designated while the index image is displayed; and when starting of regeneration in one of a plurality of the regeneration modes is commanded, the frame images are displayed on the display on a frame-by-frame basis in a regenerating method suitable for the designated regeneration mode. Thereby, the contents of the film can be confirmed by means of the index image displayed on the display, and a regeneration mode suitable for the film can be selected among a plurality of regeneration modes. Further, while the regeneration mode is sequentially regenerated, an audio signal indicating previously-stored background music is output to the display, and the music can be switched by starting/stopping, or posing/resuming the sequential regeneration in the regeneration mode. Thus, the background music can be effectively switched, so that the operator can enjoy the regeneration of the film images.

Moreover, the present invention is directed to a film image regenerating method, in which developed photographic film is fed to an image reading section so that a frame image can be read, and a plurality of frame images on the photographic film are displayed on a display, provided with an index display mode for reading frame images in a plurality of frames on the photographic film and making an index image composed of a plurality of frames to display it on the display, and a plurality of regeneration modes for reading the frame images on a frame-by-frame basis and displaying the readout frame images on a frame-by-frame basis on the display; the index image is displayed first on the display in the index display mode while a film image is displayed; a regeneration starting frame is allowed to be designated while the index image is displayed; and when the regeneration starting frame is designated and starting of regeneration is commanded in a regeneration mode, the frame images are displayed on the display on a frame-by-frame basis. That is, a desired regeneration starting frame can be designated while the index image is viewed, and thereby the unnecessary frame images can be prohibited from being regenerated. Moreover, after the index image is displayed on the display in the index display mode, and before the frame images are regenerated on a frame-by-frame basis in the regeneration mode, the all-frame title common to all frames on the photographic film can be entered. That is, the suitable all-frame title can be entered after the contents captured into the photographic film are confirmed by means of the index image. Furthermore, if the all-frame title is entered or if the magnetic information indicating the all-frame title is read from the magnetic recording layer on the film, the all-frame title is displayed on the display after the index image is displayed in the index display mode until the regeneration on a frame-by-frame basis starts in the regeneration mode. Thereby, the contents captured into the film can be confirmed from the index display up to the frame-by-frame regeneration in the regeneration mode.

Moreover, the present invention is directed to a film image regenerating device, which has an index display mode for reading frame images in a plurality of frames on the photographic film and making an index image composed of a plurality of frames to display it on said display, and a regeneration mode for reading a frame image of one frame on the photographic film and displaying the read frame image on the display on a frame-by-frame basis, which comprises a manipulation means, editing means for editing print order information for making additional prints based on manipulation of the manipulation means, and a recording means for the print order information edited by the editing means in an information recording section on the photographic film, wherein the editing means has a first piece of information capable of being edited only in the index display mode, a second piece of information capable of being edited only in the one-screen regeneration mode, and a third piece of information capable of being edited in both the index display mode and the one-screen regeneration mode. That is, the print order information required for making additional prints can be edited on both the index screen and the one-frame screen. In addition, the print order information to be edited is classified into the information which is handled only on the index screen, the information which is handled only on the one-frame screen, and the information which is handled on both screens.

Furthermore, the present invention is directed to a film image regenerating device, which performs a sequence of image regenerating processes such as feeding developed photographic film having an information recording section to an image reading section so as to read frame images, and displaying each frame image on the photographic film on a display means, and which comprises: an information reading means for reading information recorded in the information reading section on the photographic film; an error detecting means for detecting an error of treading information read by the information reading means; a warning means for warning that a reading error takes place when an error of reading information is detected, and a means for stopping the sequence of image regenerating processes when the regeneration error detecting means detects the error of reading information, and continuing the rest of image regeneration processes upon an instruction by a user. Thus, even if the error takes place when the magnetic information is read, the user can recognize the error and can operate the device without being confused.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 8(A), 8(B), 8(C) and 8(D) are views showing a CCD buffer in the film player in FIG. 1, a storage area in a display buffer, and a display screen of a TV monitor;

FIG. 14 is a row of data including LRC indicating a parity value in a longitudinal direction of a data field;

DETAILED DESCRIPTION OF THE PREFERRED EMBODIMENTS

Figure 1:
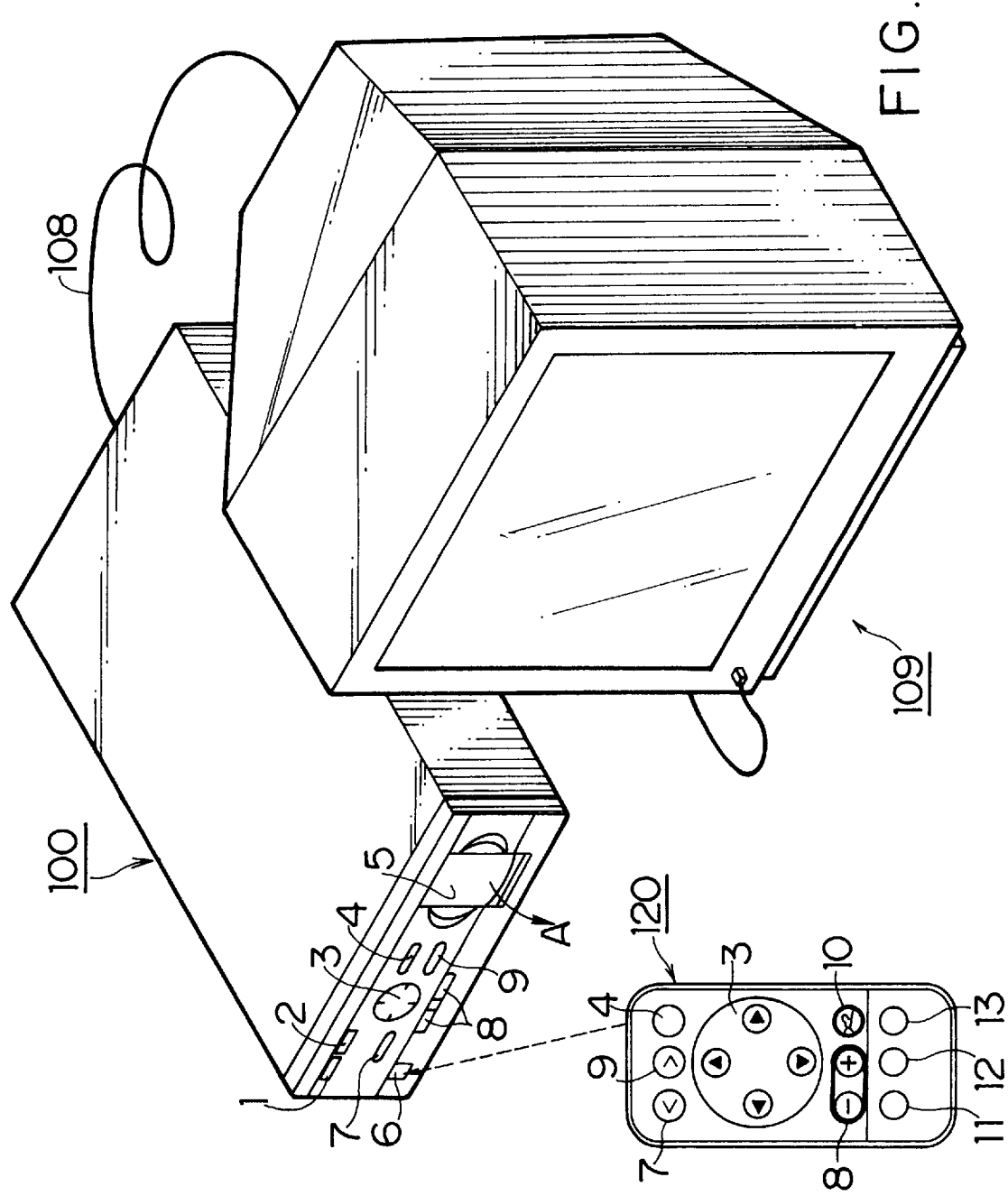
FIG. 1 is a perspective view showing the structure of the whole system including a film player to which the present invention applies.

FIG. 1 is a perspective view showing the structure of the whole system including a film player to which the present invention applies. As shown in FIG. 1, the film player 100 is rectangular-parallelepiped, and a "power source" key 1, a "take out" key 2, a "select" key 3, a "menu" key 4, a cartridge bucket door 5, a remote controller light accepting section 6, a "reverse" key 7, a zoom key 8, an "execution/play" key 9 are provided at the front of the film player 100. The cartridge bucket door 5 is opened in the direction of an arrow A when the film cartridge (see FIG. 2) is inserted or taken out.

The film player 100 connects to a TV monitor 109, and outputs a video signal and an audio signal to the TV monitor via a signal cable 108. A remote controller 120 is attached to the film player 100, which can receive an infrared remote controller signal from the remote controller 120 via a remote controller light accepting section 6. The keys with the same function as that of the keys at the front of the film player 100 are denoted by the same reference numerals. Numeral 10 is a "X2" key, 11 is a "skip" key, 12 is a "rotation" key, and 13 is a "data display" key. A detailed explanation will be given later about the control of the film player 100 by use of the remote controller 120.

Figure 2:
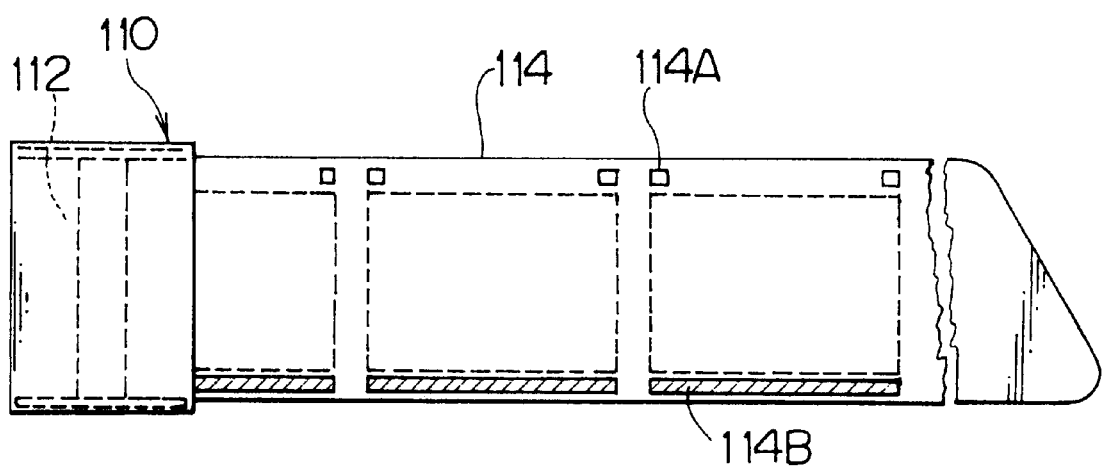
FIG. 2 is a view showing one example of a film cartridge applied to the film player in FIG. 1.

The film cartridge 110 applied to the film player 100 has a single spool 112 as shown in FIG. 2, and photographic film 114 is wound around the spool 112. Perforations 114A are punched in the photographic film 114 to indicate a position of each frame, and a magnetic recording layer 114B is formed on the whole surface of the film or the edge of the film. The camera with the magnetic head can record the magnetic data such as the photographing data of each frame on the magnetic recording layer 114B. The film cartridge 110 winds up and houses therein the developed photographic film 114.

A camera using the film cartridge 110 is capable of recording a variety of magnetic data on a frame-by-frame basis on the magnetic recording layer 114B on the photographic film 114 by use of the magnetic head built in the camera. The camera is capable of recording a variety of magnetic data such as a frame number, a print format of high vision image, panoramic image or normal image, the date/time of photographing, the size of a captured image, an object distance, positions of a main object within one screen. Not only a camera but also a photo-finishing device can record the data such as the print type and the size of the frame image on the magnetic recording layer 114B on the photographic film 114. The film player 100 may also record the magnetic data as described later. Furthermore, a bar code indicating a film type, a frame number, etc. and the data indicating the print type by means of a light source built in the camera during photographing can be optically recorded on the photographic film 114 except for the frame area which is exposed by the object light.

Figure 3:
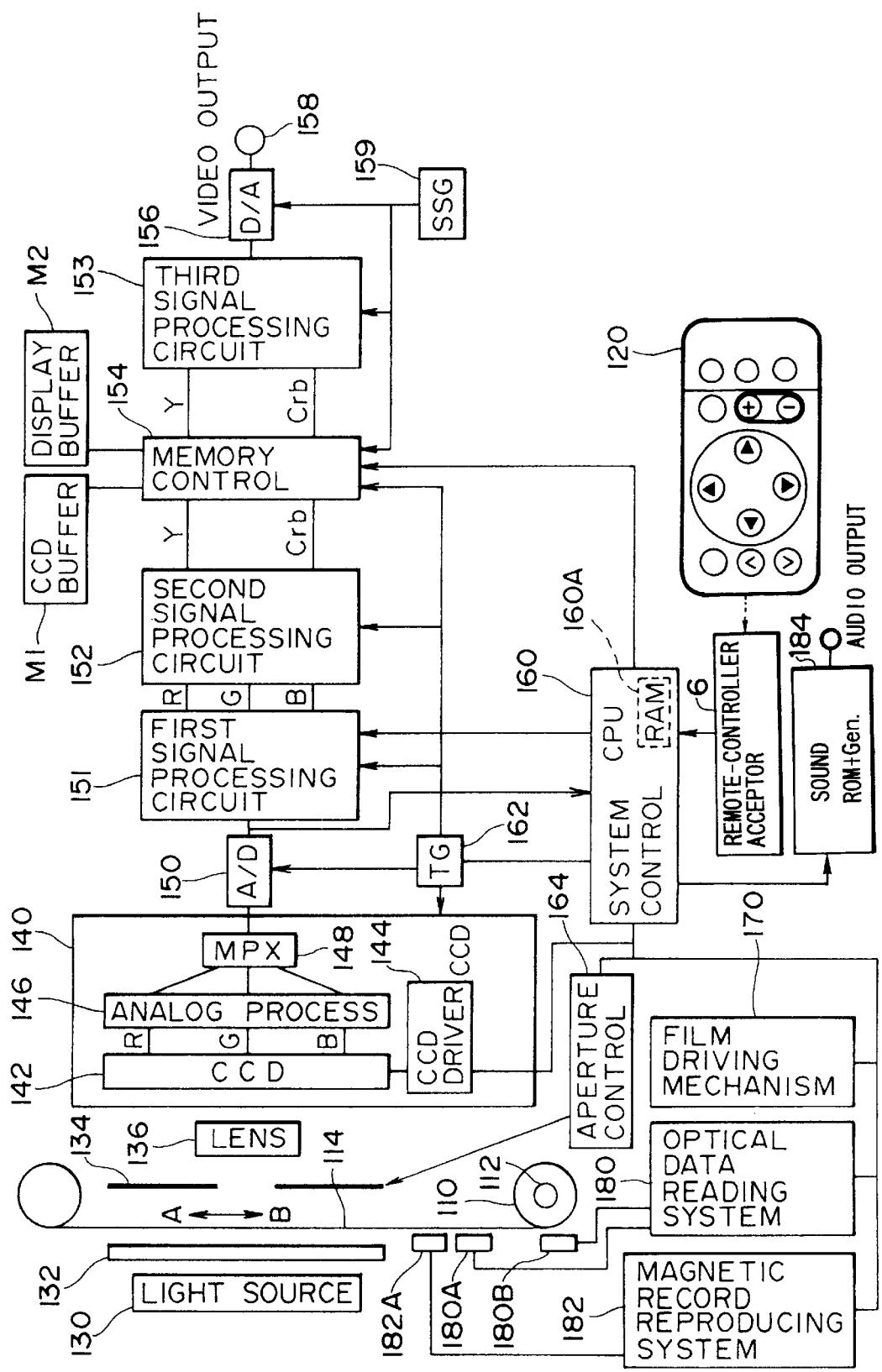
FIG. 3 is a block diagram showing one embodiment of the inner structure of the film player in FIG. 1.

FIG. 3 is a block diagram showing one embodiment of the inner structure of the film player 100. The film player 100 is composed mainly of a light source 130 for illumination, a taking lens 136, a CCD circuit unit 140 including a CCD line sensor 142, a first signal processing circuit 141, a second signal processing circuit 152, a third signal processing circuit 153, a memory controlling circuit 154, a CCD buffer M1, a display buffer M2, a central processing unit (CPU) 160, a film driving mechanism 170, an optical data reading unit 180, a magnetic data regenerating unit 182, and a sound producing unit 184. The light source 130 is, for example, a long fluorescent light which extends in a direction perpendicular to a feed direction of the film 114. The light source 130 illuminates the film 114 through an infrared cutting filter 132. The image light is transmitted through the film 114, and is formed on a light accepting plane of the CCD line sensor 142 through the taking lens 136 which is a fixed-focus type. While the CCD line sensor 142 is picking up the film image, the film 114 is moved in the direction of an arrow A (hereinafter referred to as a forward direction) or in the direction of an arrow B (hereinafter referred to as a backward direction) at a fixed speed by the film driving mechanism 170. A detailed explanation will be given later about the driving of the film.

The CCD line sensor 142 is provided in the direction perpendicular to the film feed direction. The image light formed on the light accepting plane of the CCD line sensor 142 is charged for a predetermined period of time in each sensor, which has a R, G or B filter, and is converted into R, G and B signal charge which corresponds to the light strength. The signal charge is sent to a shift register by a lead gate pulse of a predetermined cycle, which is added by the CCD driving circuit 144, and is sequentially read out from the CCD line sensor 142 by a register transfer pulse.

The CCD line sensor 142 has, for example, a sensor of 1024 pixels in the direction perpendicular to the film feed direction. The number of pixels in the same direction as the film feed direction of one frame changes according to the film feed speed, if a cycle of the lead gate pulse, etc. of the CCD drive circuit 144 does not change. In this embodiment, if the film feed speed is ½, 1, 8, 16 times as fast as that in the case when the standard film image is picked up, the number of pixels is 1792, 896, 112, and 56, respectively.

The readout signal charge is clamped by a CDS clamp and sent to an analog processing circuit 146 as R, G and B signals, and the analog processing circuit 146 controls gain, etc. of the R, G and B signals. A multiplexer 148 dot-sequentially transmits the R, G and B signals output from the analog processing circuit 146. The R, G and B signals are converted into digital signals by the A/D converter 150, and are sent to the first signal processing circuit 151 and the CPU 160.

The first signal processing circuit 151 includes a white balance adjusting circuit, a negative-positive inverting circuit, a γ-correcting circuit, a RGB circuit which transmits R, G and B signals simultaneously, and the like. The first signal processing circuit 151 processes the R, G and B signals, which are dot-sequentially input, in each of the above-mentioned circuits, and sends R, G and B signals to the second signal processing circuit 152. The white balance adjusting circuit in the first signal processing circuit 151 adjusts the white balance based upon a control signal which is transmitted from the CPU 160. A detailed explanation will be given later about the white balance adjustment.

The second signal processing circuit 152 includes a matrix circuit, and generates a luminance signal Y and a chrome signal $C_{r/b}$ from the entered R, G and B signals. These generated signals are output to the memory controlling circuit 154.

The memory controlling circuit 154 controls the reading and writing of the luminance signal Y and the chroma signal $C_{r/b}$ in the CCD buffer M1, and controls the reading and writing of the luminance signal Y and the chroma signal $C_{r/b}$ in the display buffer M2. A detailed explanation will be given later about the control of the reading and writing in the CCD buffer M1 and the display buffer M2.

The luminance signal Y and the chroma signal $C_{r/b}$, which are read out from the display buffer M2 by the memory controlling circuit 154, are sent to the third signal processing circuit 153. The third signal processing circuit 153 generates an NTSC color composite video signal for example based on the entered luminance signal Y and chroma signal $C_{r/b}$, and outputs them to a video output terminal 158 via a D/A converter 156. A synchronous signal of a predetermined cycle is supplied to the memory controlling circuit 154, the third signal processing circuit 156 and the D/A converter 156, so that each circuit can be synchronized and a video signal including a desired synchronous signal can be obtained. A timing signal generating circuit 162, which is controlled by the CPU 160, sends a timing signal to the CCD circuit unit 140, the A/D converter 150, the first signal processing circuit 151, the second signal processing circuit 152 and the memory controlling circuit 154, so that each circuit can be synchronized.

The film driving mechanism 170 is engaged with the spool 112 of the film cartridge 110, and consists of a film supplying section which rotates the spool 112 forward and backward, a film winding section which winds the film 114 from the film supplying section, and a means which is provided in a film transport passage for feeding the film between a capstan and a pinch roller at a constant speed. The film supplying section drives the spool 112 in the clockwise direction in FIG. 3, and feeds the film 114 from the film cartridge 110 until the film winding section winds up the leader of the film.

An optical data reading unit 180 includes a first optical sensor 180A which optically detects the perforation 114A of the film 114, and a second optical sensor 180B which optically detects the optical data such as a bar code at the film edge. The optical data reading unit 180 processes the optical data which are detected by the optical sensors 180A and 180B, and outputs the data to the CPU 160. The magnetic data regenerating unit 182 has a magnetic head 182A, and reads the magnetic data recorded in the magnetic recording layer 114B on the film 114. The magnetic data regenerating unit 182 processes the magnetic data, then outputs the data to the CPU 160, and records the data in the RAM 160A. The magnetic data regenerating unit 182 converts the readout data into a signal suitable for magnetic recording, outputs the signal to the magnetic head 182A, and records the signal in the magnetic recording layer 114B on the film 114.

The sound producing unit 184 is composed mainly of ROM for storing audio data corresponding to for example three kinds of background music (BGM), and an audio signal generating unit for generating an audio signal from the audio data read out from the ROM. The sound producing unit 184 switches the BGM in accordance with the command from the CPU 160, and outputs the BGM. A detailed explanation will be given later about the switching of the BGM. The sound producing unit 184 can be used for outputting effective sounds such as key operational sounds and error sounds.

Figure 4:
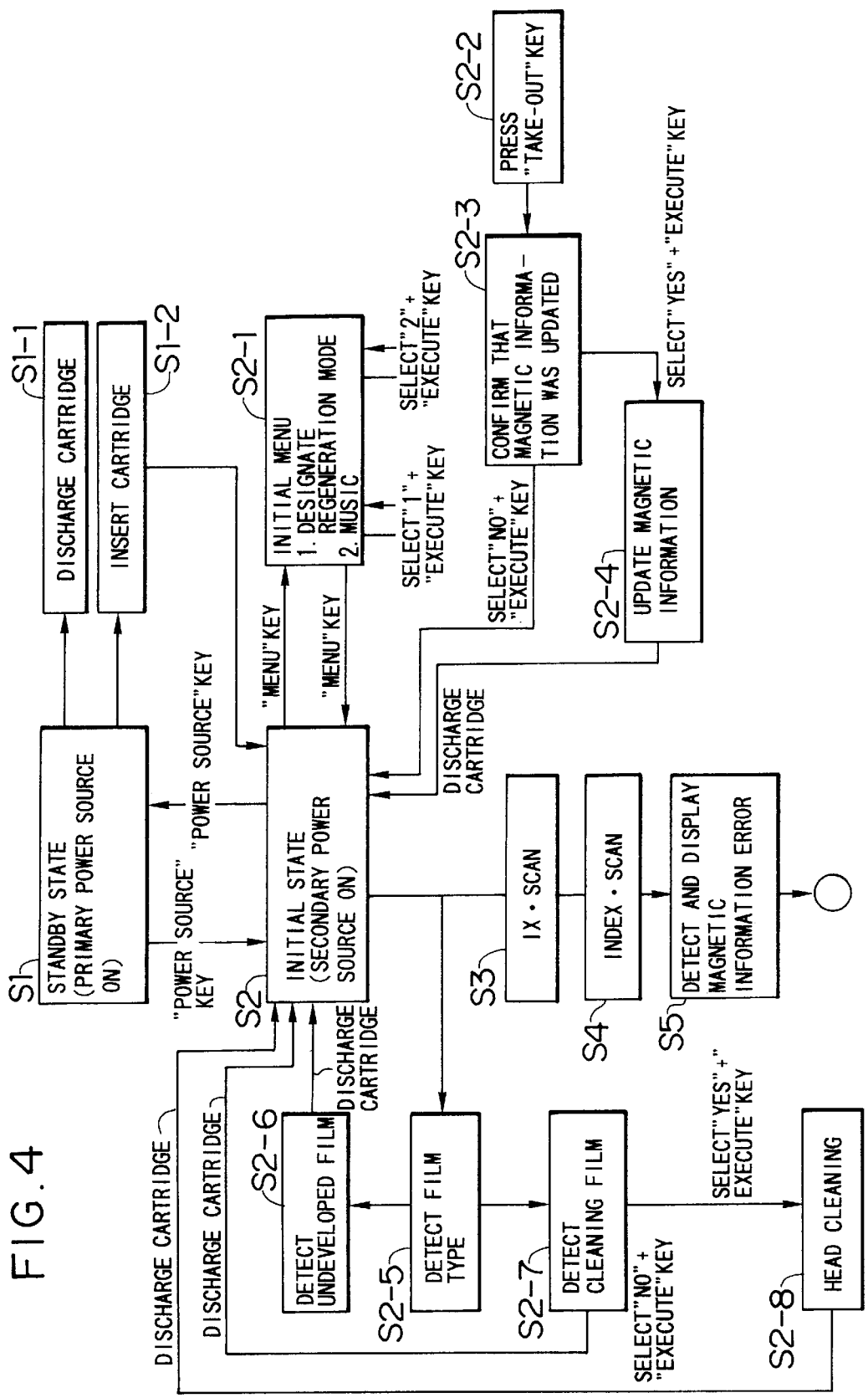
FIG. 4 is a flow chart showing the operation of the film player in FIG. 1.

Next, an explanation will be given about the operation of the film player 100 which is constructed in the above-mentioned manner with reference to the flow charts of FIGS. 4, 5, and 6.

A power source switch (not shown) at the back of the player body puts the film player 100 in a standby state (the primary power source is on) (Step S1). If the film player 100 is not used for a long time, the power source switch at the back of the player body is turned off so that the primary power source can be turned off. When the "take out" key 2 is pressed, the film cartridge can be taken out or inserted (Steps S1-1, S1-2 ). When the film cartridge is inserted, the state automatically shifts to an initial state (Step S2). When the "power source" key 1 is pressed in the standby state, the state shifts to the initial state (a secondary power source is on), and when the "power source" key 1 is pressed in the initial state, the state returns to the standby state again (Step S2).

When the menu key 4 is pressed, an initial menu is displayed on the TV monitor (Step S2-1), so that each of menus "regenerating mode designation" and "music" can be selected interactively on a screen by manipulation of the "select" key 3 and the "execute/play" key 9. That is, in the on-screen menu, the menu items are selected by manipulation of the ↑ ↓ key of the select key 3, and the contents of the selected menu items are switched by manipulation of the ←→ key. In the "regenerating mode designation" menu, one mode is selected among a slide show regeneration mode, a frame-by-frame regeneration mode, a program regeneration mode and a one-screen regeneration mode. Each regeneration mode will be explained later. In the "music" menu, whether the BGM is to be turned on or off is determined.

Figure 7:
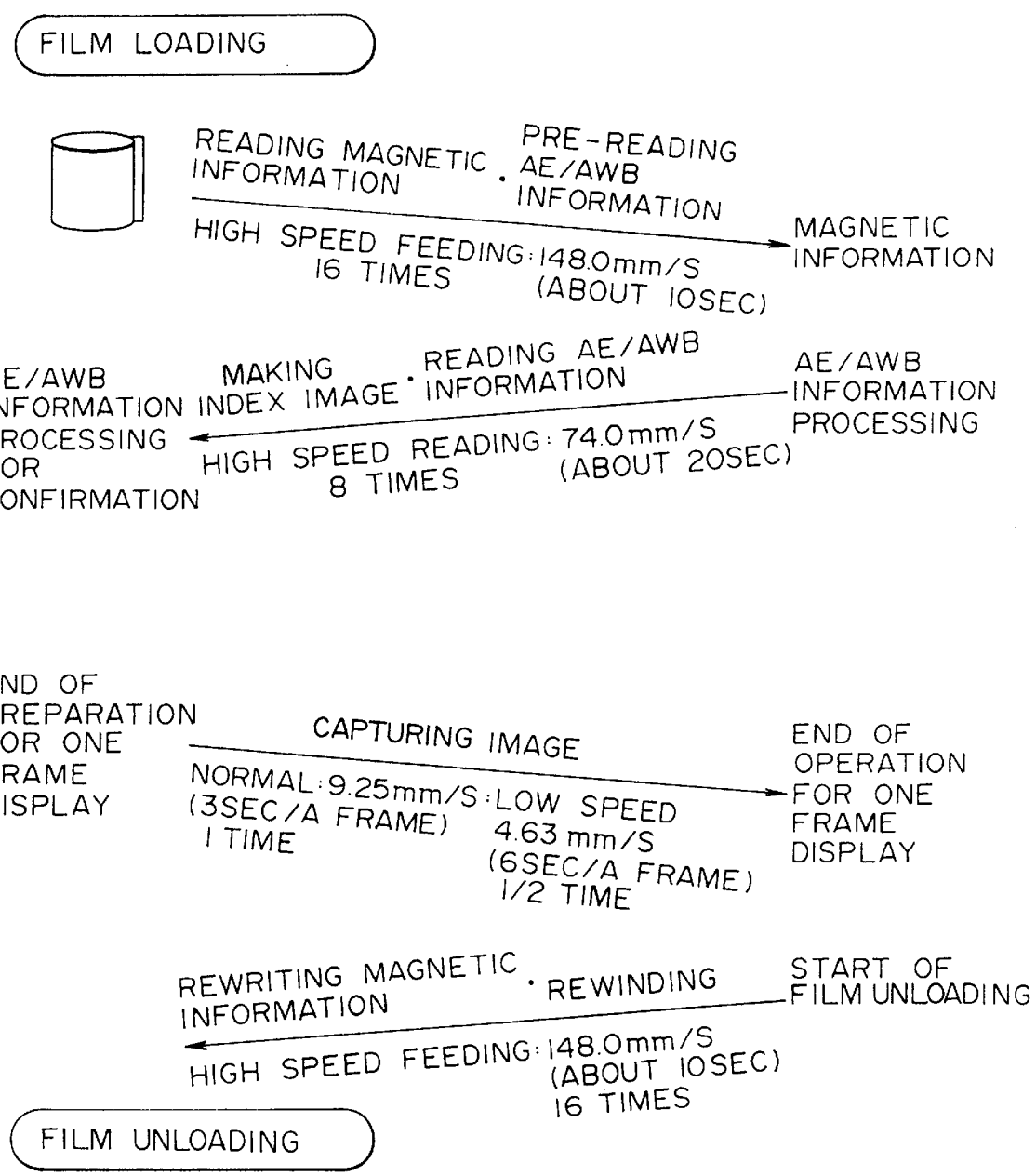
FIG. 7 is a view showing one example of a sequence of transporting film in the film player in FIG. 1.

The "take out" key 2 is active at all times, and when the "take out" key 2 is pressed (Step S2-2), predetermined processes such as rewinding of the film are performed, and then the film cartridge is discharged to initialize the state. If a variety of information has been input and edited as described later, whether or not the information (magnetic IX information) is to be updated is determined by means of the "select" key 3 (Step S2-3). If the updating is selected and the "execute/play" key 9 is pressed, the film 114 is fed from the last frame at a high speed of 148.0 mm/s in the reverse direction as shown in FIG. 7. During the feeding, the magnetic information, which is read from the magnetic recording layer on the film and is stored in the RAM 160A of the CPU 160, and the data which is edited after that are recorded again on the magnetic recording layer of all frames on the film (Step S2-4), and the cartridge is discharged after rewinding. If the magnetic information is not changed, or if the updating is not selected though the magnetic information is changed, the magnetic recording is not executed.

When the cartridge is mounted, the film type is detected (Step S2-5). That is, the CPU 160 reads a "development completion detection mark" of the cartridge, and as soon as the cartridge housing undeveloped film is detected, the cartridge is discharged (Step S2-6). If the cartridge housing developed film is detected, the CPU 160 controls the film driving mechanism 170 so that the film can be loaded. That is, the film is fed from the cartridge, and the leader of the film is wound around the windup axis of the film windup section. If the cartridge housing a cleaning film is detected during the film loading, whether the head cleaning is to be performed or not is selected by means of the "select" key. If the head cleaning is selected and the "exe cute/play" key 9 is pressed, the head cleaning is performed (Step S2-8) and then the cartridge is discharged.

When the film loading in the cartridge housing the developed film is completed, the first pre-scanning (IX-scanning) and the second pre-scanning (index-scanning) are executed (Steps S3 and S4). That is, during the IX-scanning, the film is fed at a high speed of 148.00 in the forward direction as shown in FIG. 7, and the image data is captured via the CCD line sensor 142. The optical data reading unit 180 and the magnetic data regenerating unit 182 read the optical data and the magnetic IX data.

Next, an explanation will be given about the processes based upon the image data which are captured during the above-mentioned IX-scanning.

The CPU 160 receives the dot-sequential R, G and B signals from the A/D converter 150 shown in FIG. 3. The CPU 160 captures the R, G and B signals of all frames, and calculates the offset amount for each color signal and the gain adjustment amount for each color signal in order to adjust the white balance. The CPU 160 also stores offset data indicating the offset amount for each color signal and AWB data indicating the gain adjustment amount in random access memory (RAM) 160A built in the CPU. In addition, the CPU 160 stores AE data indicating the brightness of each frame in the RAM 160A from the R, G and B signals of each frame. The CPU 160 is capable of detecting each frame on the film based upon the optical data and/or the magnetic data which are transmitted via the optical data reading unit 180 and the magnetic data regenerating unit 182. The CPU 160 can detect frame numbers by counting the frames.

Next, an index scanning of the film is executed. That is, during the index scanning, the film 114 is rewound in the reverse direction at a high speed of 74.0 mm/s as shown in FIG. 7, and the image data is captured again via the CCD line sensor 142. When the image data is captured, the CPU 160 controls an aperture 134 for each frame via an aperture control unit 164 based on the AE data stored in the RAM 160A. If the CCD line sensor 142 has an electronic shutter mechanism, the electric charge accumulating time in the CCD line sensor is controlled via the CCD driving circuit 144 so that the exposure can be adjusted. In this case, the aperture 134 and the aperture control unit 164 are not required.

The CPU 160 outputs the offset data, which are stored in the RAM 160A for each color signal of each frame, to the first signal processing circuit 151, which adjusts the offset amount of the dot-sequential R, G and B signals based on the offset data. Likewise, the CPU 160 outputs the AWB data, which are stored in the RAM 160A for each color signal of each frame, to the first signal processing circuit 151, which adjusts the gain of the dot-sequential R, G and B signals based on the AWB data.

The image data of each frame are adjusted based on the AE/AWB data, etc., and thereby the satisfactory image data can be captured regardless of photographing conditions of each frame.

The image data of each frame, which are adjusted in the above-mentioned manner, that is, the luminance signal and the chroma signal $C_{r/b}$, which are output from the second signal processing circuit 152, are sequentially stored in the CCD buffer M1 via the memory control circuit 154. As stated previously, the film is fed at a speed which is eight times as fast as the feed speed when a standard film image is captured, and thereby the number of pixels in the same direction as the direction in which the film is fed by one frame is 112 as shown in FIG. 8(A). The CCD line sensor 142 has a sensor of 1024 pixels in a direction perpendicular to the film feed direction. The number of pixels is decreased to be 1/16 so that the number of pixels in a direction perpendicular to the direction in which the film is fed by one frame can be 64. The CCD buffer M1 has a storage capacity for storing the data of 512×1024 pixels as shown in FIG. 8(A) so as to store the image data of 5×4×2(=40) frames. That is, the image data indicating the index image of 40 frames are stored in the CCD buffer M1.

The display buffer M2 has a storage capacity for storing the data of 512×1024 pixels as shown in FIG. 8(B). In order to store the image data indicating the above-mentioned index image, the number of pixels in one frame is increased to be 73×128 so that the image data of 5×4(=20) frames can be stored. An area of 480×640 pixels at the upper left of the display buffer M2 is read out so that the index image can be displayed on the TV monitor (see FIGS. 8(B) and 8(C)).

As shown in FIG. 8(A), the image data of each frame are sequentially stored in the CCD buffer M1 from the upper left storage area to the right in an order in which the image data of each frame are read during the scanning. If the image data in four frames have bee n stored, the image data are sequentially stored from a storage area one line below to the right. If the image data in five lines (4×5=20 frames) have been stored, the image data is stored in a next to storage area of 20 frames in the above-mentioned manner.

While the image data are being stored in the CCD buffer M1, the stored contents in the CCD buffer M1 are transferred to the display buffer M2.

The image data of only 20 frames can be simultaneously stored in the display buffer M2. For this reason, if the image data of the twenty-first frame are input into the CCD buffer M1, the image data are updated in the display buffer M2 and read out from the display buffer M2 such that the index image can be scrolled up. For example, when the image data of the twenty-first frame are input into the CCD buffer M1, the image data in the storage area in one line of the frames No. 1–4 in the display buffer M2 are cleared, and the image data of the twenty-first frame are written, and the scan starting address when the video signal is output is changed to the second line. Thereby, the index image which has scrolled up by one line is displayed on the TV monitor. If the image data of all frames have been stored in the CCD buffer M1, the screen is scrolled down or switched so that the index image of the frame Nos. 1–20 can be displayed on the TV monitor. During the IX-scanning, an error in regenerating the magnetic IX information is detected. If the error takes place, the error is displayed, and the error sound is sounded (Step S5 in FIG. 4). In this case, when the "execute/play" key 9 is pressed, the process continues.

With an explanation about the detection/process, etc. of the error in regenerating the magnetic IX information, an explanation will be given about a recording format for recording the magnetic IX information in the magnetic track.

Figure 13:
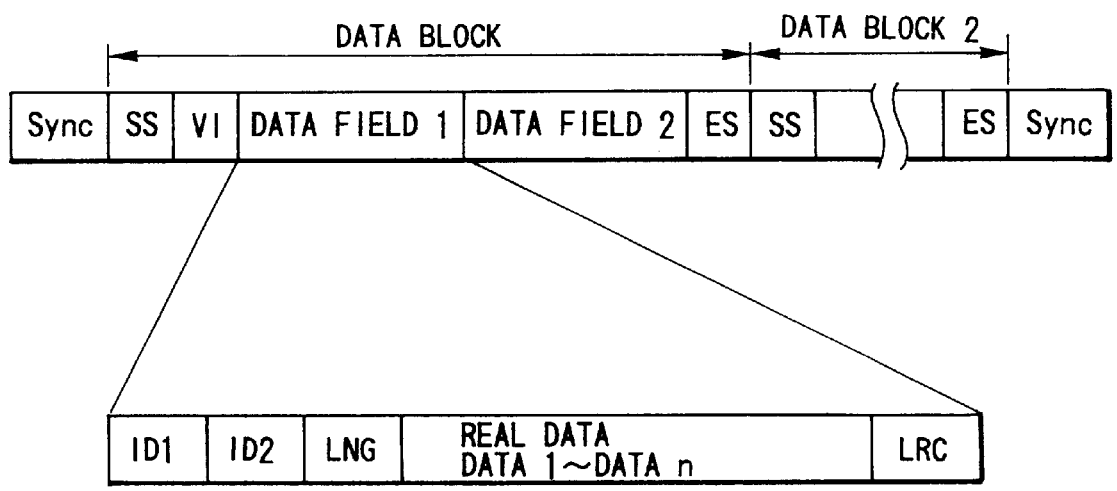
FIG. 13 is a view showing a format for recording magnetic information recorded on a magnetic track on photographic film.

As shown in FIG. 13, the magnetic IX information is constructed with data field and data block as a unit. One data field is composed of ID codes ID1 and ID2 as control codes for specifying the data recorded in the field; a LNG provided in front of the actual data DATA1–DATAn for indicating the data length of the field; and a LRC provided behind the actual data DATA1–DATAn for indicating parity values in the vertical direction from the ID1 to the DATAn. One data block is composed of a SS mark indicating the start of the block; a VI mark provided in front of one or plural data fields for indicating a version number; and an ES mark provided behind the data field for indicating the end of the block. The magnetic information is recorded by overwriting the block plural times. The highest bit in all data recorded as the magnetic IX information is assigned to a parity bit of the byte data as shown in FIG. 14. In FIG. 13, Sync is a synchronous signal in which more than four bit of "0" are recorded.

Next, an explanation will be given about how the magnetic IX information is regenerated, edited and recorded again with reference to the flow chart of FIG. 15.

Figure 15:
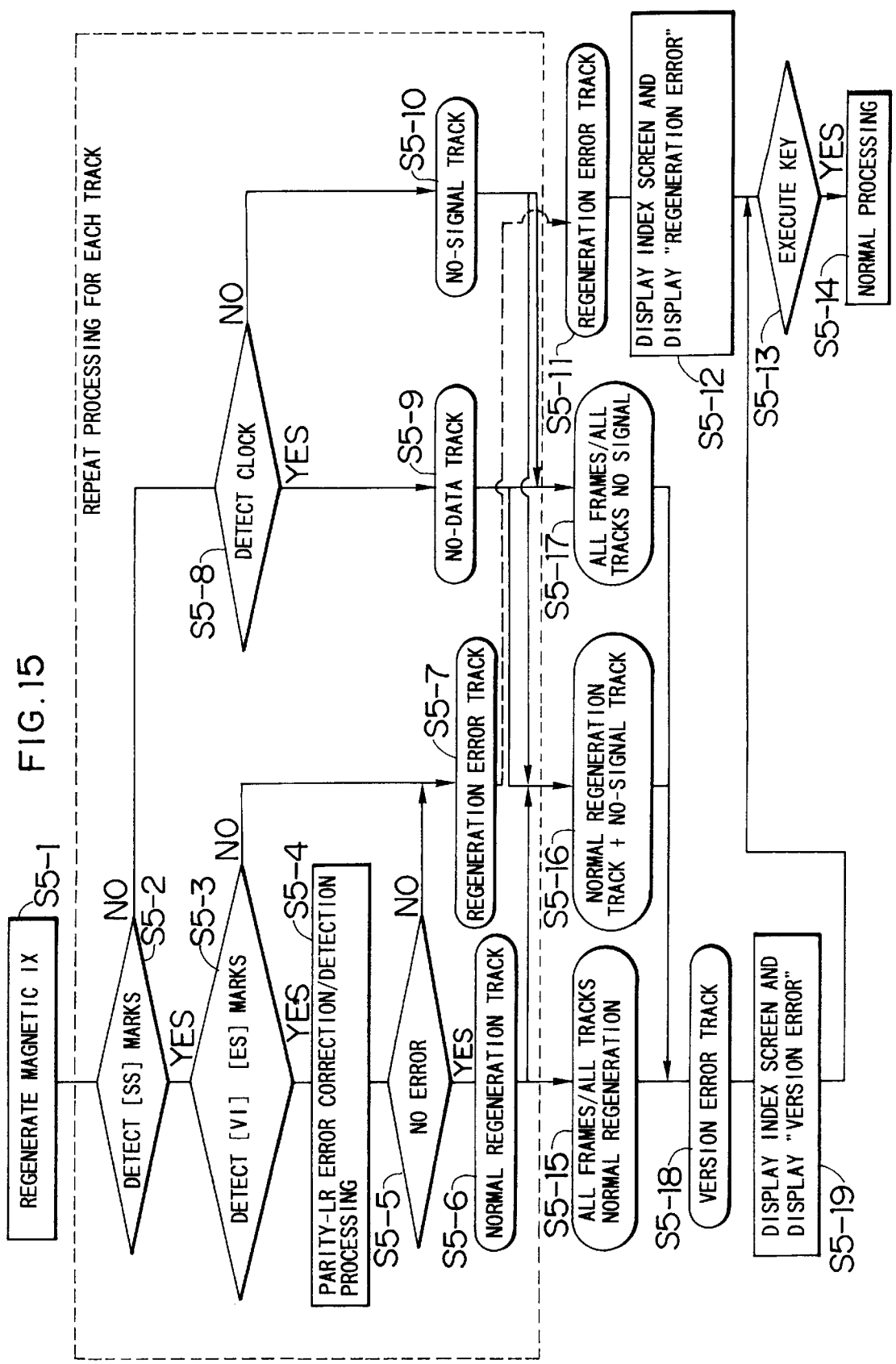
FIG. 15 is a flow chart showing how to cope with an error in regenerating magnetic information.

As shown in FIG. 15, the magnetic IX information is regenerated (Step S5-1) when the film is fed. The regenerated information is analyzed for each frame. If a SS mark, an ES mark and a VI mark are located at normal positions, and if the LNG is correct and all data are normal, including the case that an error of one bit is detected by checking the LRC and the error is corrected, the magnetic track of the frame is handled as a normal regeneration track (Step S5-6).

On the other hand, when there is the SS mark, and if one of the ES marks, the VI marks, and the LNG is incorrect, or if an error of more than two bit takes place, the magnetic track of the frame is handled as a regeneration error track (Step S5-7). If there is no SS mark (Step S5-2), the magnetic track is handled as a no-data track (Step S5-9) and a no-signal track (Step S5-10), depending on whether there is a clock or not (Step S5-8).

The same processing is performed for all frames, and if there is one or more regeneration error tracks (S5-11), the "magnetic IX regeneration error" is displayed on the TV monitor (Step S5-12) just after the index screen is displayed. The user determines whether the processing should be continued or not. If the regeneration error takes place, and the user decides to continue the processing (that is, the user presses the "execute/play" key 9), the processing can be continued in the same manner as in the case when the frame images are normally regenerated (Step S5-14).

On the other hand, if there is no regeneration error track (Steps S5-15, S5-16, and S5-17), and if there is a version error track (Step S5-18), "magnetic IX version error" is displayed on the TV monitor just after the index screen is displayed (Step S5-19). The user decides whether the processing is continued or not. If the user decides to continue the processing, the processing can be continued (Step S5-14) even through a version error takes place.

If the user decides to discontinue the processing (that is, the user presses the "take-out" key 2), the film is rewound.

The information required for automatic regeneration, etc. relating to the direction, the print type, and so forth have their initial values. The initial direction and print type are "upper" and "high vision", respectively.

Figure 5:
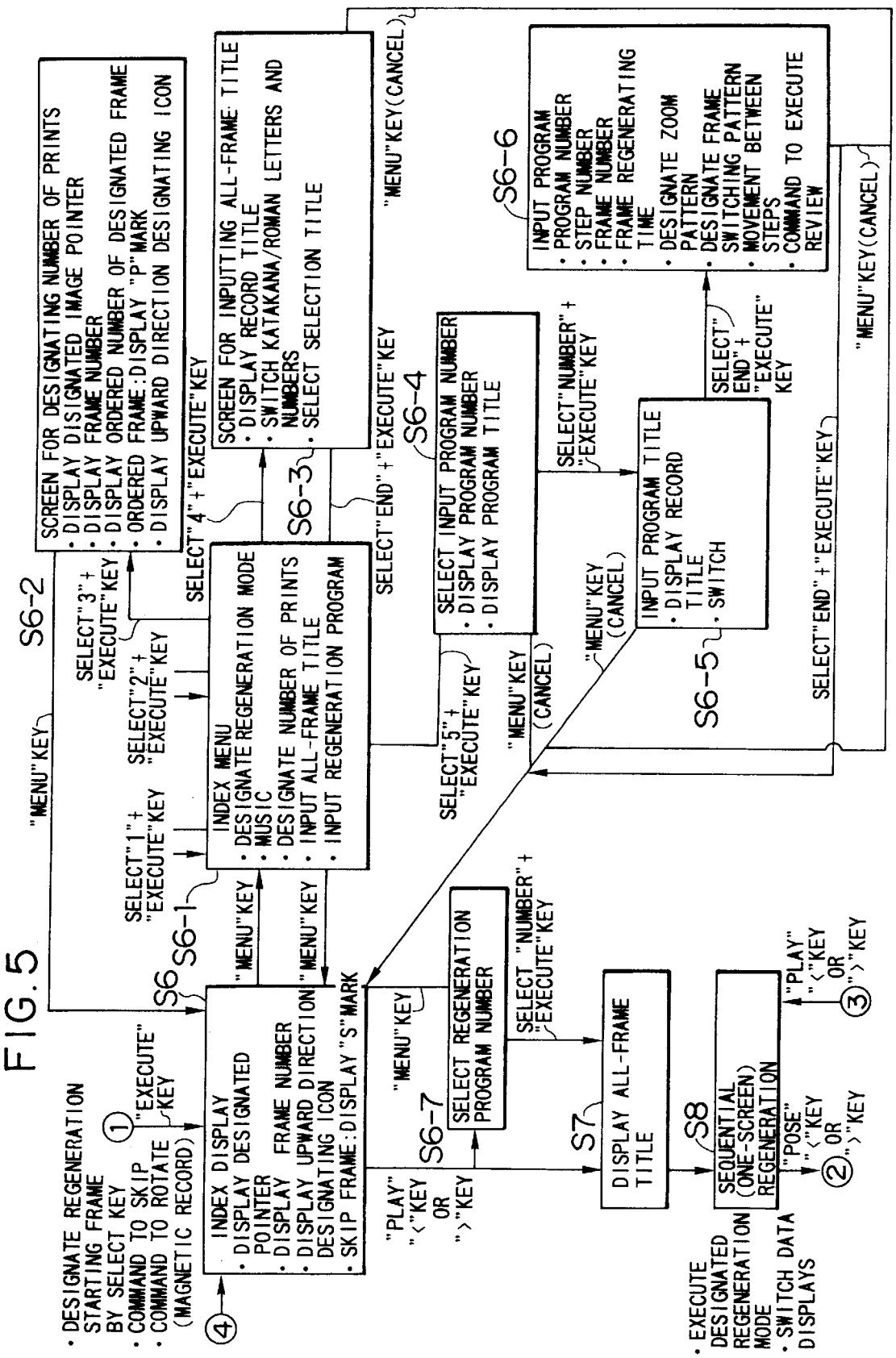
FIG. 5 is a flow chart showing the operation of the film player in FIG. 1.
Figure 9:
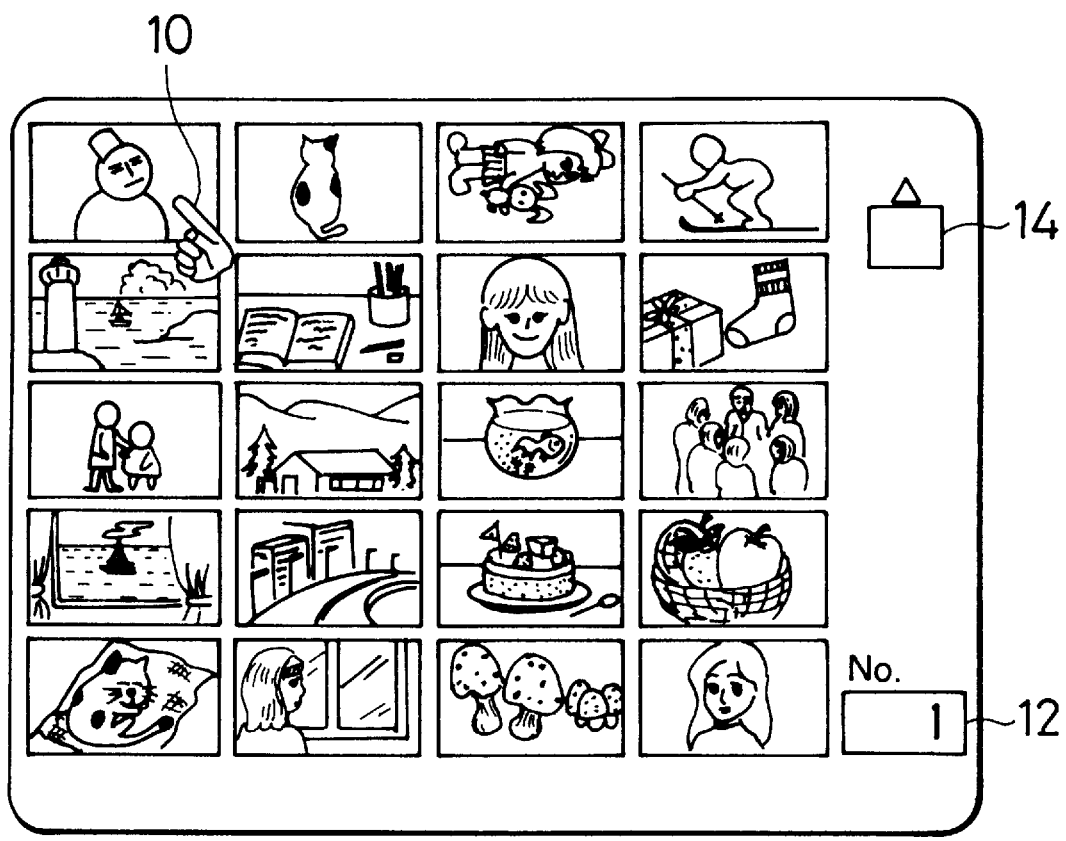
FIG. 9 is a view showing an index image.

The index image, which is created as stated above, is displayed on the TV monitor (Step S6 in FIG. 5). The screen of the TV monitor in this case is shown in FIG. 9. As shown in FIG. 9, twenty index images are displayed, and an image selection mark 10, a frame number 12, and an upward direction mark 14 indicating the direction of the frame are displayed as well. The image selection mark 10 can be moved up, down, right and left by manipulation of the "select" key 3. The frame number 12 and the upward direction mark 14, which are selected by the image selection mark 19, are displayed. If the "execute/play" key 9 or the "reverse" key 7 is pressed, the regeneration starts in the frame designated by the image selection mark 10 in the designated regeneration mode.

Figure 10A:
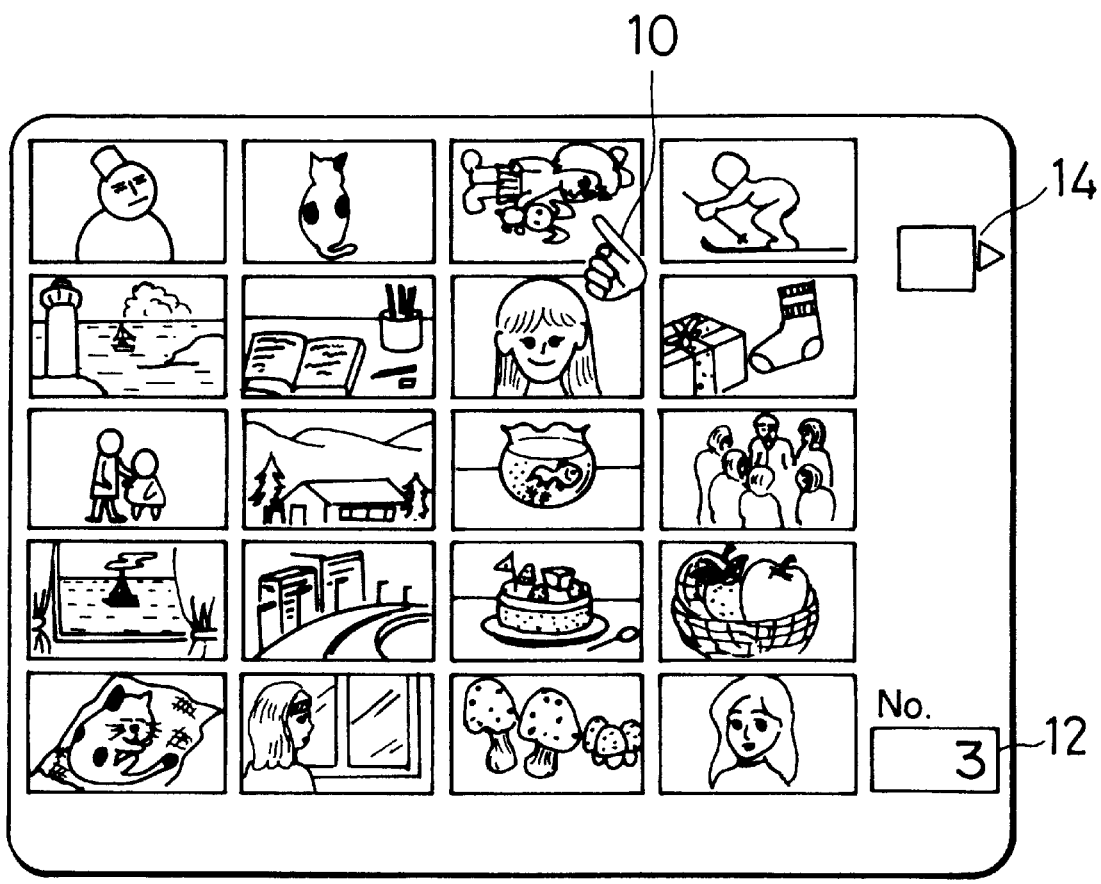
FIGS. 10(A) and 10(B) are views showing how to set the length and width of a frame by means of an index image.
Figure 10B:
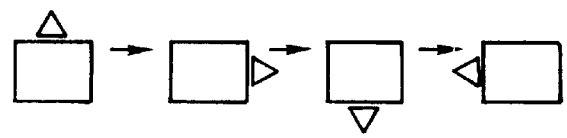

Next, an explanation will be given about the case when each frame is designated to turn upward on the index screen. As shown in FIG. 3, the image selection mark 10 is moved to a frame (the third frame in FIG. 10(A), which is to be directed to turn upward. Then a "rotation" key 12 of the remote controller 120 is pressed in order to direct the frame to turn upward. The upward direction mark 14 rotates 90° clockwise as shown in FIG. 10(B) every time the "rotation" key 12 is pressed, and the rotated upward direction mark 14 directs the frame to turn upward.

Figure 11:
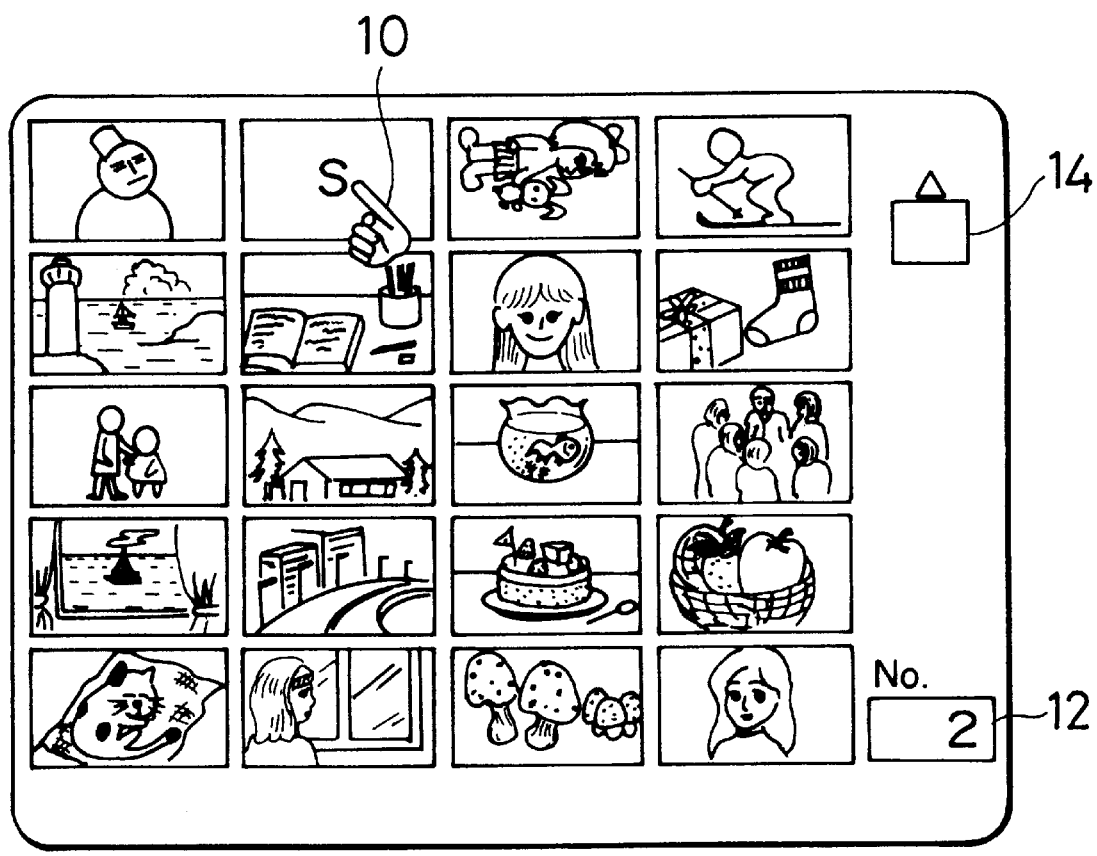
FIG. 11 is a view showing bow to set the skip.

When a non-display frame in the regeneration mode is designated, as shown in FIG. 11, the image selection mark 10 is moved to a frame (the second frame in FIG. 11), which is to be designated as the non-display frame while the "select" key 3 is manipulated. Thereafter, the non-display frame is deleted from the index image, and a "S" mark representing a skip is displayed.

On the other hand, when the "menu" key 4 is pressed while the index image is displayed, the index menu is displayed on the TV monitor (Step S6-1). A variety of menus such as "designate number of prints", "enter all-frame title" and "enter regeneration program" can be selected in addition to the above-stated "designate regeneration mode" and "music".

Figure 12:
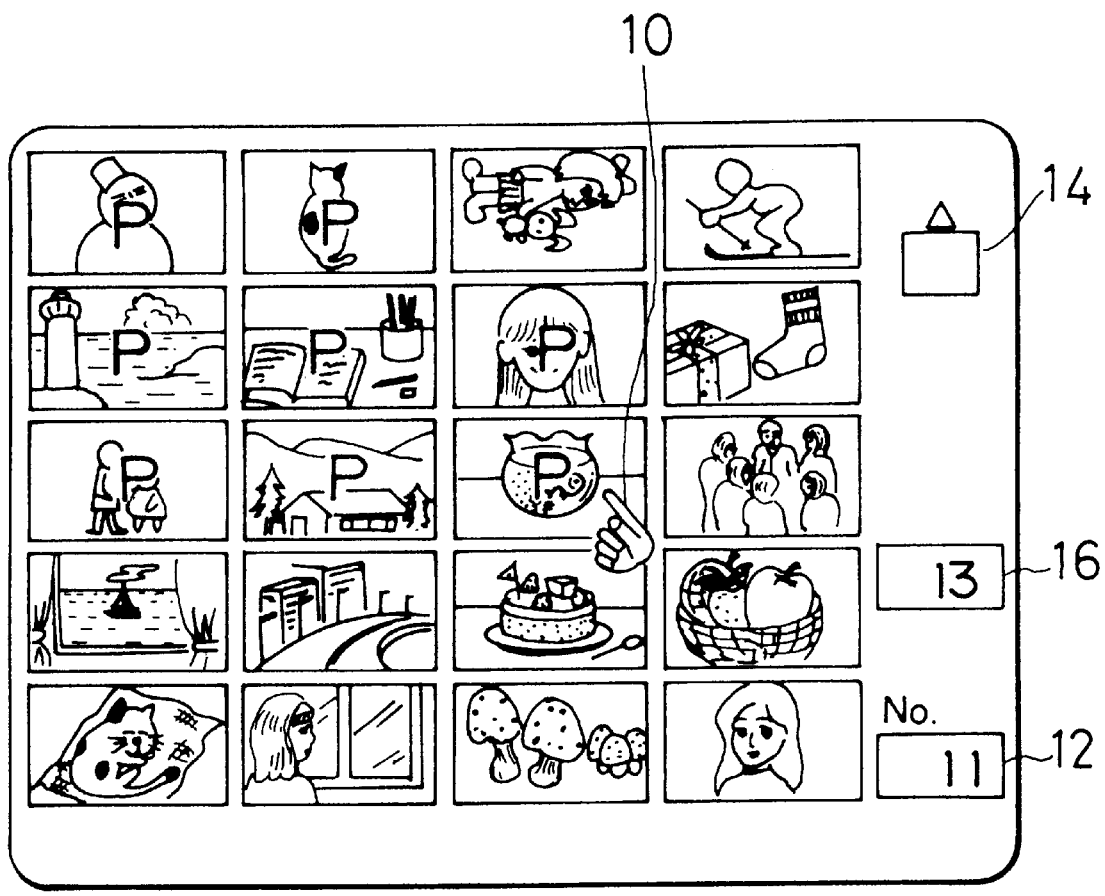
FIG. 12 is a view showing how to set the number of prints from each frame by means of an index image.

When the "designate number of prints" is selected by the ↑ ↓ key of the "select" key 3, the screen changes to one for designating the number of prints 16 as shown in FIG. 12 (Step S6-1). While the "select" key 3 is manipulated on the screen, the image selection mark is moved to a frame (the eleventh frame in FIG. 12) which is designated for printing. Then, the number of prints is increased or decreased by means of the "zoom" key 8 so that a desired number of prints can be designated. A "P" mark representing an ordered frame is displayed at the frame of the index image, which is designated to be printed.

When the menu of "enter all-frame title" is selected by means of the ↑ ↓ key of the "select" key 3 and the "execute/play" key 9 is pressed, the screen is switched to one for entering the all-frame title (the title common to all frames on a roll of film) (Step S6-3). On this screen, katakana (the Japanese syllabary), Roman letters, numerals, titles, or the like are appropriately selected by means of the "select" key 3, and a desired all-frame title can be entered.

When the menu of "input regeneration program" is selected by the ↑ ↓ key of the "select" key and he "execute/play" key 9 is pressed, the screen is switched to one for selecting a program, and a program number and a program title are displayed on the screen (Step S6-4). This menu is one for setting the regeneration of the program for sequentially regenerating a plurality of frame images on a roll of film in a desired order and with desired effects. If the number of the program to be entered and edited is selected by the ↑ ↓ key of the "select" key and the "execute/play" key 9 is pressed, the screen for "enter program title" is displayed (Step S6-5), and a desired title is entered. When the "execute/play" key 9 is pressed after the title is entered, the program title is decided and the screen for "input program" is displayed (Step S6-6).

The menu items are moved on the screen by means of the ↑ ↓ key, and the conditions for the menu items are switched by means of the ↑ ↓ key. The conditions are decided by the "execute/play" key 9. Then, "next step" is selected, and the "execute/play" key 9 is pressed to enter the next step. The examples of information entered during the program regeneration are as follows.

Frame regeneration time: regeneration time of one frame (1–15 seconds)

Designation of a zoom pattern: zoom-up, zoom-down, and no pattern

A pattern of screen movement: a pattern of screen movement after zooming or during initial display; right→left, left→right, upper→lower, lower→upper, and no pattern A pattern of frame switching: a method of switching displays when a frame is switched to the next frame; overlap, wipe, and fade As stated previously, the regeneration modes include the following four regeneration modes: the slide show regeneration mode, the frame feeding regeneration mode, the program regeneration mode, and the one-screen regeneration mode. The slide show regeneration mode is one for automatically and sequentially regenerating frame images with display effects by utilizing the photographic information relating to the print type designated by the camera, or the like.

That is, the film player 100 is capable of reading the magnetic information recorded in the magnetic recording layer 114B on the film 114 by means of the magnetic data regenerating unit 182. The magnetic information indicating the print type, the photographing data, the direction of the captured image, the size of the main object, the position of the main object on a screen, etc. are magnetically recorded by means of the magnetic head built in the camera during photographing.

Thus, the film player 100 can automatically set the automatic regeneration information shown in the following Table by reading the magnetic information which are recorded by the camera during photographing.

TABLE 1

| Magnetic information | Automatic regeneration information | Contents |
| --- | --- | --- |
| Direction | Information as to length and breadth of the frame | An object is reproduced on the TV monitor based on the information as to the length and breadth of a frame. A magnification is changed based on the information as to the length and breadth of a frame so that a frame image can be reproduced on the |

TABLE 1-continued

| Magnetic information | Automatic regeneration information | Contents |
|---|---|---|
| Date of photographing | Information as to screen switching | whole screen of the TV monitor. When the frames at intervals of predetermined days are switched, the scene fades in/out. |
| | Information as to title | Titles of a holiday, an event, etc. are read out in accordance with the date of photographing, and the title is displayed. (Sequentially-stored) print information (wedding ceremony/birthday, etc.) are read out in accordance with the date of photographing, and the title is displayed. |
| Size of main object (camera-to-object distance and focal length of taking lens) | Information as to automatic zooming | When a main object is smaller than a predetermined size (such a size as to make the object easy to see), information as to starting magnification of electronic zooming, ending magnification of zooming and zooming time are automatically set. |
| | Automatic close-up | When the main object is smaller than a predetermined size, the main object is electronically closed up to be the predetermined size. |
| Position of main object | Information as to automatic zooming (center) | Electronic zooming is used for information as to zooming central position. |
| | Information as to automatic close-up (center) | Electronic close-up is used for information as to close-up central position. |
| Print type | Information as to movement on screen | When the print type is designated to be panoramic, the image is displayed and enlarged to be panned and tilted. |
| | Information as to display on screen | The range and magnification of the image regeneration on the TV monitor are automatically set. |

The relationship between the photographing date and the title information is stored in the memory in the film player 100 in advance.

As stated above, a variety of information for improving the effects of automatic regeneration can be automatically set based upon the magnetic information which is recorded by the camera in advance. The slide show mode is a regeneration mode using the above-mentioned information as a portion of the automatic regeneration information.

The frame feeding regeneration mode is a regeneration mode for sequentially regenerating the frame images while feeding the frames at regular intervals using the whole screen. The program regeneration mode is a regeneration mode for sequentially regenerating the frame images in accordance with at least one of the frame regeneration order, one-frame regeneration time, zoom pattern, screen movement pattern, and frame switching pattern which are set in advance as stated previously. The one-screen regeneration mode is a regeneration mode for regenerating the frame images on a frame-by-frame basis in accordance with the manual manipulation.

When the "execute/play" key 9 or the "reverse" key 7 is pressed, the all-frame title, which is entered in the step S6-3, is displayed on the index display screen (Step S7) after the index display screen is displayed until the sequential (one screen) regeneration starts in the designated regeneration mode. Then, the frame images are regenerated in the designated regeneration mode in the forward direction from the regeneration starting frame up to the last frame, or in the backward direction from the regeneration starting frame to the first frame (Step S8). If the program regeneration mode is selected, a regeneration program number is selected and the "execute/play" key 9 is pressed, the automatic regeneration starts in the program regeneration mode (Step S6-7). If no regeneration mode is designated, the regeneration starts in a predetermined regeneration mode (e.g. the slide show regeneration mode or the previous regeneration mode).

If one frame is regenerated according to each regeneration mode in the step S8, the film is fed up to the regeneration starting frame. As shown in FIG. 7, the film 114 is fed by one frame at a speed of 9.25 mm/s, so that the regeneration starting frame can be scanned (main scanning). During the main scanning, the image data is captured into the CCD buffer M1 via the CCD line sensor 142.

When the image data are captured, the CPU 160 adjusts the image data of each frame based on the AE data, the AWB data, etc. stored in the RAM 160A. The good image data can be captured regardless of the photographing conditions of each frame. The number of pixels for one frame, which are captured into the CCD buffer M2, is 512×896 as shown in FIG. 8(D). That is, the CCD outputs of the CCD line sensor 142 having the sensor for 1024 pixels are decreased to ½ during the main scanning. Thereby, the number of pixels is 512 in a direction perpendicular to the film feed direction of one frame. The film feed speed is lowered to ⅛ of that in the case when the image data of the index image are captured. Thereby, the number of pixels in the same direction as the film feed direction of one frame is 896, which is eight times as many as the number of pixels (112 pixels) in the same direction as the film feed direction of one frame of the index image.

The image data of one frame captured into the CCD buffer M1 are transferred to the display buffer M2. The stored contents of the display buffer are repeatedly read out, so that the image of one frame can be displayed on the TV monitor. Thereafter, the frame images are sequentially read on a frame-by-frame basis according to the regeneration mode, and the frame images are displayed on the TV monitor.

When a "data display" key 13 of the remote controller 120 is pressed during the regeneration in the step S8, the display/non-display, etc. of the frame data are switched. That is, every time the "data display" key 13 is pressed, the state of "no display data" is switched to "data display 1" →"data display 2"→"data display 3"→"no data display". In the "data display 1", the frame number is displayed on the frame image, and in the "data display 2", the photographing date and the frame number are displayed on the frame image. In the "data display 3", the photographing date, the print type, the shutter speed, the diaphragm value, the all-frame title, the title of each frame, the frame number, etc. are displayed on the frame image.

Figure 6:
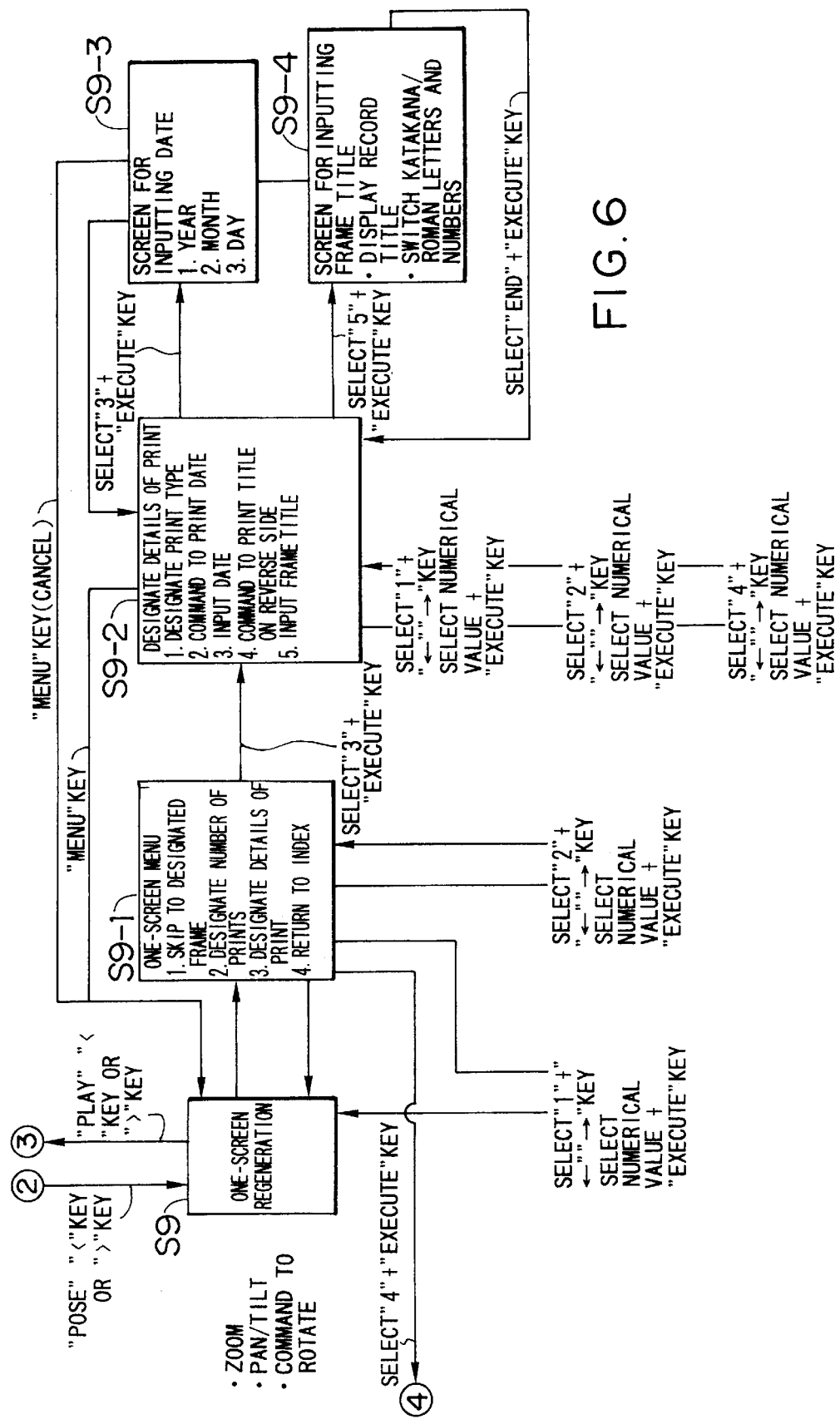
FIG. 6 is a flow chart showing the operation of the film player in FIG. 1.

When the "execute/play" key 9 or the "reverse" key 7 are pressed during the sequential regeneration in the step S8, the regeneration stops temporarily as shown in the step S9 of FIG. 6. When the "execute/play" key 9 or the "reverse" key 7 is pressed in this state, the sequential regeneration starts again (Step S8). Three pieces of background music are sequentially switched by starting/stopping or posing/resuming the sequential regeneration in the regeneration mode.

Furthermore, if the regeneration mode is the one-screen regeneration mode, or if the sequential regeneration stops temporarily to start the one-screen regeneration, the display screen can be panned/tilted, rotated, zoomed manually, and enlarged two times. That is, in the state of the one-screen regeneration, if the →← key of the "select" key 3 is pressed, the screen can be panned (right and left), and if the ↑ ↓ key is pressed, the screen can be tilted (up and down). Every time the "rotation" key 12 of the remote controller 120 is pressed, image can be rotated 90° counterclockwise. When the zoom key 8 is pressed, the image is zoomed up/down. In this case, the zooming is the electronic zooming, which is performed by interpolating and decreasing the image data. The magnification is between about 0.5 and 2.

When a "X2" key 10 of the remote controller 120 is pressed, the image is magnified twice to be displayed. That is, when the "X2" key 10 is pressed after the display area is moved by means of the "select" key 3 and the zoom key 8, the image is scanned again based on the display area at a resolution which is twice the normal resolution. During the scanning, the film 114 is fed at a speed of 4.63 mm/s (½ of the speed in the normal main scanning). In this case, the CCD outputs of the CCD line sensor 142 are not decreased, and the image data are captured based on the zooming center designated by the "select" key 3. Thereby, the image data are zoomed to be twice the size of the image data in the case of the normal main scanning. If the image data is electronically zoomed, the image data can be zoomed a maximum of four times.

When the menu key 4 is pressed during the one screen regeneration (Step S9 of FIG. 6), the one-screen regeneration menu is displayed on the TV monitor (Step S9-1), a variety of menus such as "skip to designated frame", "designate number of prints", "enter date, designate details of print" and "return to index" can be selected.

In the one-screen menu in the step S9-1, when the menu of "skip to designated frame is selected by the ↑ ↓ key of the "select" key, and a numerical value is selected by the →← key, the process returns to the step S9, and one selected frame is regenerated.

In the one-screen menu, when the menu of "designate details of print" is selected by means of the ↑ ↓ key of the "execute/play" key and the "execute/play" key 9 is pressed, a screen for designating details of a print appears so as to designate the details of the print (Step S9-2). On this screen, the print type (P/H/C) is designated, and it is designated whether the date is printed on both the right side and the reverse side of the print or only the reverse side, and that the title is printed on the reverse side of the print.

An explanation will be given about a method of designating the print type and directing to print the title on the revere side.

The examples of the all-frame title are an all-frame selection title and an all-frame free title. The examples of the each-frame title are a frame selection title and a frame free title. The operator freely inputs the free title in the steps S6-3 and S9-4. During photographing by the camera, the selection title is selected among the previously-set plural titles which are defined by the language designation code and the title code.

In order to designate the titles printed on the reverse side of the print, "command to print title on reverse side" is selected on the screen for designating details of print (Step S9-2), and then the titles are switched by means of the →← key of the "select" key 3 in the following order:, and "no designation" → "only frame free title" → "only frame selection title" → "only all-frame free title" → "only all-frame selection title" → "all-frame free title and frame free title" → "all-frame free title and frame selection title" → "all-frame selection title and frame free title" → all-frame selection title and frame free title" → "all-frame selection title and frame selection title". When the "execute/play" key 9 is pressed, whether the titles are designated for all frames and each frame or not is displayed with "*" as shown below, and the designated titles are displayed on the TV monitor.

Designation of titles for printing: all-frame selection title and frame free title
* all frame: Birthday
* frame: Taro Age 11

If no title is designated, the title column is "blank". The characters representing the command to print the title on the reverse side may be displayed instead of "*". If the free titles are designated as the all-frame title and the each-frame title, and if the title is in a language which is not handled by the device, the message of "the title cannot be displayed" is displayed in the title column. On the other hand, if the selection title is selected and the title code indicates a language which is not handled by the device, if the title code indicates what is common to all languages, that is translated into English to be displayed, and if the title code indicates what is peculiar to each language, the language designation code and the title code are displayed in the title column (for example, in the case of "Thanksgiving" in English, the language designation code is L-13, and the title code is T-53.)

As stated previously, the all-frame title, the each-frame title, etc. can be displayed on the frame image by manipulation of the "data display" key 13 of the remote controller 120. In this case, only the title which is designated to be printed on the reverse side is displayed. Thus, if the information as to printing on the reverse side is "no designation", the title is not displayed.

On the other hand, the information as to the command to print the title on the reverse side, which is recorded in the leader section, is used as the information for selecting the selection title or the free title of the all-frame title which is displayed first in the automatic regeneration. That is, the first title is displayed in the next automatic regeneration display based on the information as to printing on the reverse side. However, if the free title is selected but the language designation code indicates a language which is not handled by the device, the title column is blank. When there is no information but there is the free title for all frames, the free title is displayed. In this case, if there is no free title but there is the selection title, the selection title is displayed. If there is no free or selection title, the title column is blank.

On the screen for designating details of print, the menu of "input date" is selected by means of the "↑ ↓" key 9 and the "execute/play" key 9 is pressed, the screen for inputting the date appears (Step S9-3). On this screen, katakana, Roman letters, numbers, the selection title, or the like are appropriately selected by means of the "select" key 3, so that a desired each-frame title can be input. On the one-screen menu in the step S9-2, if the menu of "return to index" is selected by means of the ↑ ↓ key of the "select" key 3 and the "execute/play" key 9 is pressed, the index scanning is executed again, and the index screen is displayed (Step S6 in FIG. 5). In this embodiment, the magnetic recording layer coated on the photographic film is used as the information recording section on the photographic film, which records the information as to the print type, the photographing date, the direction of the frame, or the like. However, the present invention is not restricted to this. The information may be recorded in a storage means attached to the film cartridge in which the photographic film is housed.

Figure 16:
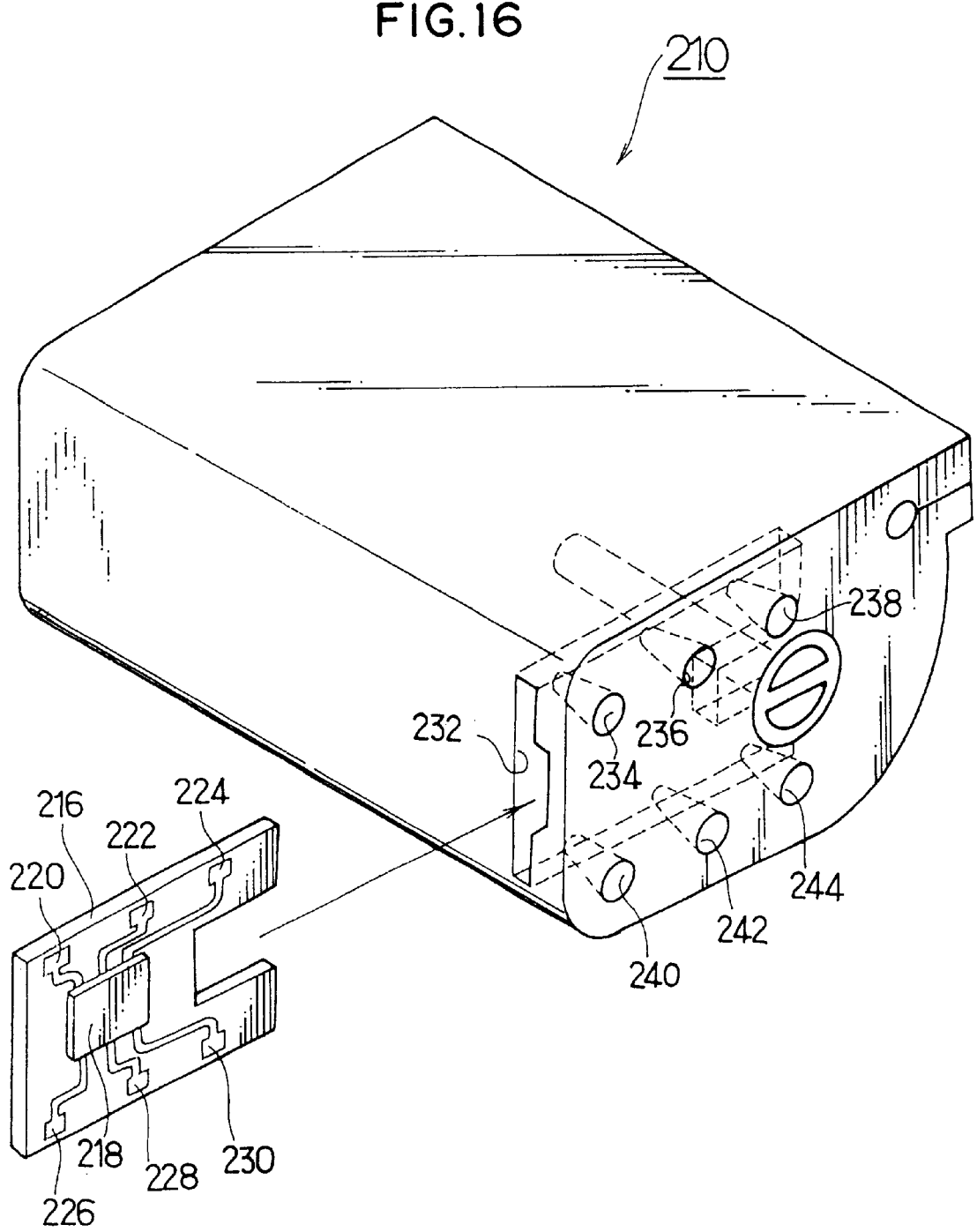
FIG. 16 is a perspective view showing one example of a film cartridge provided with an IC unit used as an information recording section.

FIG. 16 shows an example of a film cartridge provided with an IC unit 216 which is used as an information recording section. The IC unit 216 can be housed in a housing section 232 of the film cartridge, and it consists of a non-volatile memory 218 in which a variety of information can be recorded, and six electrode plates 220, 222, 224, 226, 228, and 230 connecting to the non-volatile memory 218. Contact pin holes 234, 236, 238, 240, 242, 244 are formed at positions corresponding to the six electrode plates 220, 222, 224, 226, 228, and 230 of the IC unit 216. Thus, the film player, etc. can record information in the non-volatile memory 218 in the film cartridge 211 or read out information from the non-volatile memory 218 by having the contact pins abut against the electrode plates 220, 222, 224, 226, 228 and 230 via the contact pin holes 234, 236, 238, 240, 242, and 244.

As set forth hereinabove, according to the present invention, a desired regeneration mode can be selected among a plurality of regeneration modes after the index image is displayed. For this reason, the contents of a roll of film can be known by means of the index image before the regeneration mode, and thereby a suitable regeneration mode can be selected. It is possible to designate the regeneration starting frame during the regeneration in the regeneration mode by means of the index image, thereby prohibiting unnecessary frame images from being regenerated. Moreover, what is captured into the photographic film can be known by means of the index image, and thereby a suitable all-frame title can be given to the particular film. The all-frame title is displayed after the index image is displayed until one-frame regeneration starts in the regeneration mode, so that the images on the film can be confirmed after the index image is displayed until one-frame regeneration starts in the regeneration mode. Furthermore, previously-stored plural pieces of background music are switched by starting/stopping or posing/resuming the sequential regeneration in the regeneration mode. Thereby, the background music can be effectively switched, so that the operator can enjoy the regeneration of the film image.

According to the present invention, the print order information required for making additional prints are input and edited on the index screen, and the frequently-edited information among the information as to the whole film or each frame is handled on the index screen. Hence, the print order information required for making additional prints can be edited and recorded clearly and easily. Furthermore, even if an error takes place during the regeneration of the information recorded in the information recording section, the message to that effect is displayed, and the operator specifies whether to continue the process without being confused. Furthermore, if there is no information as to the designation of the title printing in the regenerated information, the title is prohibited from being displayed on the display. If there is the title information as well as the language designation code indicating the language of the title in the regenerated information, and if the language designation code is not a predetermined one, the message to that effect is displayed on the display, or the title display area on the display is made blank, or only the language designation code and a title code indicating the selected title are displayed on the display, or the title which has been translated into a predetermined language is displayed. Thereby, the user can easily confirm the title.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A film image regenerating method, in which frames images of developed photographic film are read, and a plurality of the frame images are displayed on a display, said film image regenerating method comprising:

creating an index image composed of a plurality of frames based on a plurality of the frame images and displaying the index image on said display in an index display mode; and designating one of a plurality of regeneration modes for reading and displaying the frame images on a frame-by-frame basis, wherein when one of a plurality of said regeneration modes is designated, said index image is displayed on said display after said designation but before starting the designated regeneration mode, wherein the plurality of said regeneration modes include at least:

a slide show regeneration mode for sequentially and automatically regenerating frame images with display effects utilizing photographing information, recorded in an information section on said photographic film, and a program regeneration mode for sequentially regenerating frame images according to at least one of a zoom pattern and a screen movement pattern, each of which are set in advance.

2. The film image regenerating method as defined in claim 1, wherein said information recording section on said photographic film includes at least one of a magnetic recording layer on said photographic film and a storing area, attached to a film cartridge in which said photographic film is housed.

3. The method of claim 1, wherein said plurality of regeneration modes further include:

a frame feeding regeneration mode for sequentially regenerating frame images on a complete screen by feeding frames at regular intervals; and a one screen regeneration mode for regenerating frame images on a frame-by-frame basis according to manual manipulation, and wherein said program regeneration mode can further sequentially regenerate frame images according to at least one of a regeneration order of frames, a regeneration time of one frame and a frame switching pattern, set in advance.

4. A film image regenerating method, in which frame images of developed photographic film are read, and a plurality of the frame images are displayed on a display, said method comprising:

creating an index image composed of a plurality of frames based on a plurality of the frame images and displaying the index image on said display in an index display mode; and designating a regeneration starting frame and starting a regeneration mode for reading and displaying the frame images, beginning with the regeneration starting frame, on a frame-by-frame basis, wherein said index image is displayed on said display after said designation but before starting the regeneration mode, and wherein only the regeneration starting frame, and not the order of all frames to be regenerated, need be designated to start a regeneration mode.

5. The film image regenerating method as defined in claim 4, further comprising, selecting one of forward regeneration and backward regeneration, wherein if forward regeneration is selected in said regeneration mode, frame images beginning with said regeneration starting frame through a last sequential frame are displayed on said display on a frame-by-frame basis, and if backward regeneration is selected, frame images beginning with said regeneration starting frame through the first sequential frame are displayed on said display on a frame-by-frame basis.

6. The method of claim 4 wherein, when said regeneration starting frame is designated, frame images are sequentially regenerated in a forward direction from the regeneration starting frame to the last frame of the film, or in a backward direction from the regeneration starting frame to the first frame of the film.

7. A film image regenerating device, in which frame images of developed photographic film are read by an image reading section, and a plurality of the frame images are displayed on a display, comprising:

index image regenerating means for controlling said image reading section to read a plurality of said frame images, creating an index image composed of a plurality of frames based on a plurality of the readout frame images, and displaying said index image on said display;

frame image regenerating means for controlling said image reading section to read frame images beginning from a previously-stored regeneration starting frame among a plurality of said frame images on said photographic film, and displaying the read frame images on said display; and regenerating starting frame designating means for designating said regeneration starting frame, wherein said index image is displayed on said display after said designation but before starting displaying the designated regeneration starting frame, and wherein only the regeneration starting frame, and not the order of all frames to be regenerated need be designated to start a regeneration mode.

8. The device of claim 7 wherein, when said regeneration starting frame is designated, frame images are sequentially regenerated in a forward direction from the regeneration starting frame to the last frame of the film, or in a backward direction from the regeneration starting frame to the first frame of the film.

* * * * *